US008443356B2

(12) United States Patent
Maeda

(10) Patent No.: US 8,443,356 B2
(45) Date of Patent: May 14, 2013

(54) IMAGE FORMING APPARATUS

(75) Inventor: Yuichiro Maeda, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1008 days.

(21) Appl. No.: 12/481,872

(22) Filed: Jun. 10, 2009

(65) Prior Publication Data
US 2009/0320013 A1 Dec. 24, 2009

(30) Foreign Application Priority Data

Jun. 18, 2008 (JP) ................. 2008-159667

(51) Int. Cl.
*G06F 9/45* (2006.01)

(52) U.S. Cl.
USPC ......................................... 717/168

(58) Field of Classification Search ............. 717/168
See application file for complete search history.

(56) References Cited

U.S. PATENT DOCUMENTS

| 7,153,203 | B2* | 12/2006 | Pfarr et al. ............... 452/150 |
| 8,020,159 | B2* | 9/2011 | Hanyu ....................... 717/178 |
| 2004/0145766 | A1* | 7/2004 | Sugishita et al. ............. 358/1.13 |
| 2007/0044097 | A1* | 2/2007 | Hanyu ....................... 717/178 |
| 2008/0040712 | A1* | 2/2008 | Tanaka ....................... 717/168 |
| 2010/0058310 | A1* | 3/2010 | Choi ........................ 717/168 |
| 2010/0180271 | A1* | 7/2010 | Arsenault et al. ........... 717/168 |
| 2011/0119664 | A1* | 5/2011 | Kimura et al. .............. 717/173 |

FOREIGN PATENT DOCUMENTS

JP 2002-014833 A 1/2002

\* cited by examiner

*Primary Examiner* — John Chavis
(74) *Attorney, Agent, or Firm* — Canon USA Inc IP Division

(57) ABSTRACT

An image forming apparatus connected to a plurality of accessory device includes a storage unit configured to store a plurality of control programs to be updated corresponding to each of the plurality of accessory devices, and a control unit configured to send a control program whose update time is the longest among the plurality of control programs to be updated which are stored in the storage unit, to the accessory device in priority to other control programs.

5 Claims, 10 Drawing Sheets

FIG.4

| | | |
|---|---|---|
| UnitID | 0003 | ~401 |
| Program | filename | ~402 |
| Checksum | EF6C | ~403 |
| UpdateTime | 00D2 | ~404 |
| . . . | . . . | |

| | | |
|---|---|---|
| UnitID | 0003 | ~601 |
| Program | filename | ~602 |
| ProgramSize | 1C00 | ~603 |
| Checksum | EF6C | ~604 |
| UpdateSpeed | 0022 | ~605 |
| . . . | . . . | |

| | | |
|---|---|---|
| UnitID | 0003 | ~701 |
| UpdateSpeed | 0022 | ~702 |
| . . . | . . . | |

| | | |
|---|---|---|
| UnitID | 0003 | ~901 |
| Program | filename | ~902 |
| Checksum | EF6C | ~903 |
| UpdateTime | 00D2 | ~904 |
| DeCompressTime | 000A | ~905 |
| ... | ... | |

| | | |
|---|---|---|
| UnitID | 0003 | ~911 |
| Program | filename | ~912 |
| ProgramSize | 1C00 | ~913 |
| Checksum | EF6C | ~914 |
| UpdateSpeed | 0022 | ~915 |
| DeCompressSpeed | 02CC | ~916 |
| ... | ... | |

| | | |
|---|---|---|
| UnitID | 0003 | ~921 |
| UpdateSpeed | 0022 | ~922 |
| DeCompressSpeed | 02CC | ~923 |
| ... | ... | |

920

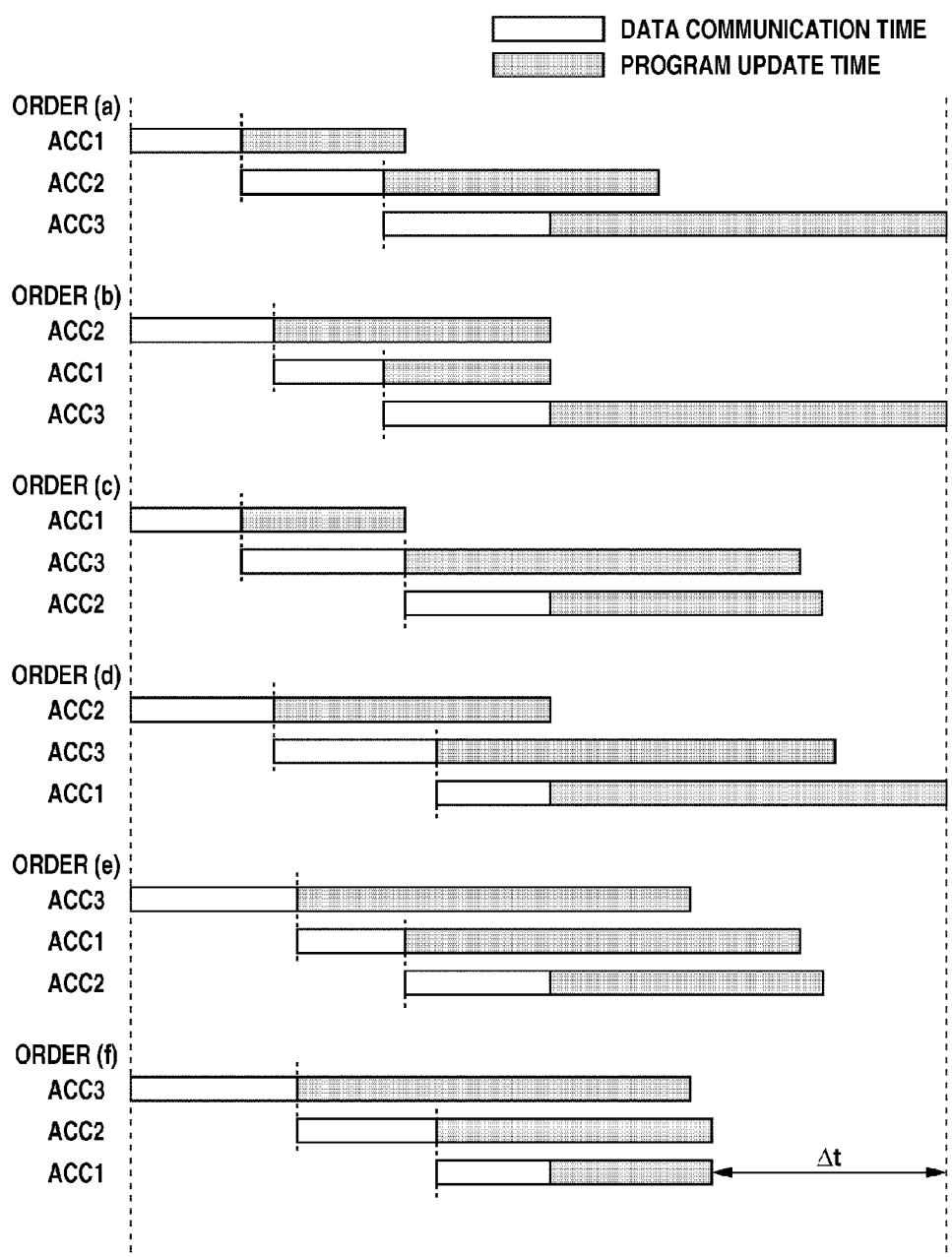

IMAGE FORMING APPARATUS

BACKGROUND OF THE INVENTION

1. Field of the Invention

The present invention relates to an image forming apparatus connected to a plurality of accessory devices (e.g., a sheet feeding device and a post-processing device).

2. Description of the Related Art

In recent years, many control programs (firmware) installed in electronic equipment are stored in electrically rewritable non-volatile memory (flash read-only memory (ROM)) Thus, opportunities to upgrade control programs such as corrections of bugs and additions of functions have increased.

In the case of version upgrade of control programs, various techniques for reducing time and task required for updating the control programs have been discussed. For example, a technique for dividing a control program into predetermined units to be rewritten and changing only portions to be updated rather than changing the whole program, when the control program is updated is discussed (For example, refer to Japanese Patent Application Laid-Open No. 2002-014833). By the technique, time required for updating one control program can be shortened.

In a high-speed model optimized for mass printing, an image forming system commonly has a configuration in which a number of sheet feeding devices for storing a larger amount of various sheets and post-processing devices for accomplishing extensive bookbinding functions are connected to the system.

Generally, in such an image forming system, an image forming apparatus and accessory devices such as a document reading device, a sheet feeding device, and a post-processing device which constitute a system, each has individual central processing unit (CPU) and control program. The system implements a series of image forming control via communication between each of the accessory devices.

According to the invention discussed in the above-described Japanese Patent Application Laid-Open No. 2002-014833, time required for updating one control program can be shortened. However, when control programs for a plurality of accessory devices each having individual CPU and control program are updated, it is necessary to consider update time of the control program in each accessory device. A specific example of such consideration will be described below.

FIG. 11 illustrates a comparison of lengths of time required to complete updating control programs, when a transmission order of the control programs to each accessory device is changed.

The image forming apparatus manages data of control programs of each accessory devices ACC 1, ACC 2, and ACC 3 connected thereto. The accessory devices include, for example, a paper deck for feeding sheets to the image forming apparatus, a stacker for storing a large amount of output products, a case bookbinding device for performing case bookbinding, a finisher having stapling and saddle stitch bookbinding functions.

When control programs of each accessory device are upgraded, the image forming apparatus sends the latest version of the control program to each of the accessory devices. At this time, the control programs need to be sent one by one to each accessory device.

Since after the data is sent, the control program is updated by an accessory device which receives the data, the image forming apparatus can send a control program to next accessory device while the accessory device updates the program.

For this reason, when transmission orders of the control programs to each of the accessory devices ACC 1, ACC 2, and ACC 3 are changed, for example, from an order (a) to an order (f), the lengths of time required to complete updating the control programs are varied.

More specifically, as illustrated in the order (a), if the transmission order to accessory devices is determined without considering the update time of control programs, the length of time required to complete updating the control programs becomes longer by Δt compared with the case of the order (f).

SUMMARY OF THE INVENTION

The present invention relates to an image forming apparatus which can shorten update times of control programs as the whole system when control programs of a plurality of accessory devices connected to the image forming apparatus are updated.

According to an aspect of the present invention, an image forming apparatus connected to a plurality of accessory devices includes a storage unit configured to store a plurality of control programs to be updated corresponding to each of the plurality of accessory devices, and a control unit configured to send a control program whose update time is the longest among the plurality of control programs to be updated which are stored in the storage unit, to the accessory device in priority to other control programs.

According to another aspect of the present invention, an image forming apparatus connected to a plurality of accessory devices includes a storage unit configured to store a plurality of control programs to be updated corresponding to each of the plurality of accessory devices together with information about sizes of control programs, a collection unit configured to collect information about update speeds corresponding to each of the plurality of accessory devices therefrom, and a control unit configured to calculate update time of control programs based on the information about the sizes of the control program stored in the storage unit and the information about the update speeds collected by the collection unit, and to send a control program of which the calculated update time is the longest, to the accessory device in priority to other control programs.

According to yet another aspect of the present invention, an image forming apparatus connected to a plurality of accessory devices includes a storage unit configured to store a plurality of control programs to be updated corresponding to each of the plurality of accessory devices in a compressed status, and to store information about update time of the control programs and information about decompression time required in decompressing the control programs that are previously compressed, and a control unit configured to calculate total time of the update time and the decompression time stored in the storage unit, and to send a control program of which the calculated total time is the longest, to the accessory device in priority to other control programs.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary

FIG. 4 illustrates an example of additional information added to a control program in a first exemplary embodiment.

FIG. 6 illustrates an example of additional information added to a control program in the first exemplary embodiment.

FIG. 7 illustrates an example of additional information added to a control program in a second exemplary embodiment.

FIGS. 9A, 9B, and 9C illustrate examples of additional information added to control programs in a third exemplary embodiment.

FIG. 11 illustrates comparison of time required to complete the updates of control programs, when a transmission order of the control programs to each accessory device is changed.

DETAILED DESCRIPTION OF THE EMBODIMENTS

Various exemplary embodiments, features, and aspects of the invention will be described in detail below with reference to the drawings.

Figure 1:
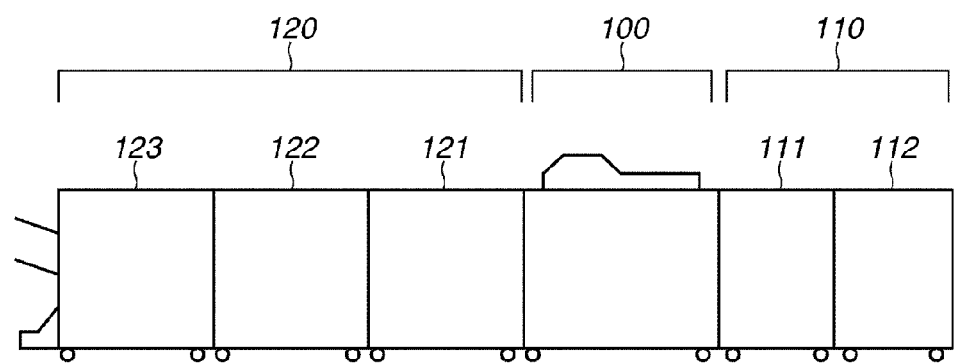
FIG. 1 illustrates an example of the overall configuration of an image forming system.

FIG. 1 illustrates an example of the overall configuration of an image forming system according to a first exemplary embodiment.

An image forming apparatus 100 forms images on sheets. A sheet feeding accessory unit 110 stores sheets to be fed to the image forming apparatus 100. A sheet discharge accessory unit 120 binds sheets on which images are formed by the image forming apparatus 100 in various forms.

The sheet feeding accessory unit 110 can store a greater amount of sheets by connecting a plurality of paper decks to the unit. FIG. 1 illustrates a case where two paper decks 111 and 112 are connected each other as an example.

The sheet discharge accessory unit 120 is configured with various accessory devices such as a stacker for storing a large amount of output products, a case bookbinding device for performing case bookbinding, a finisher having stapling and saddle stitch bookbinding functions. The accessory devices are connected together according to workflow of a user.

The sheet discharge accessory unit 120 may include a puncher for punching holes in sheets, a folding device for performing Z-folding, and a trimmer for trimming output products in addition to the above-described devices. FIG. 1 illustrates a case where a stacker 121, a case bookbinding device 122, and a finisher 123 are connected each other as an example.

Figure 2:
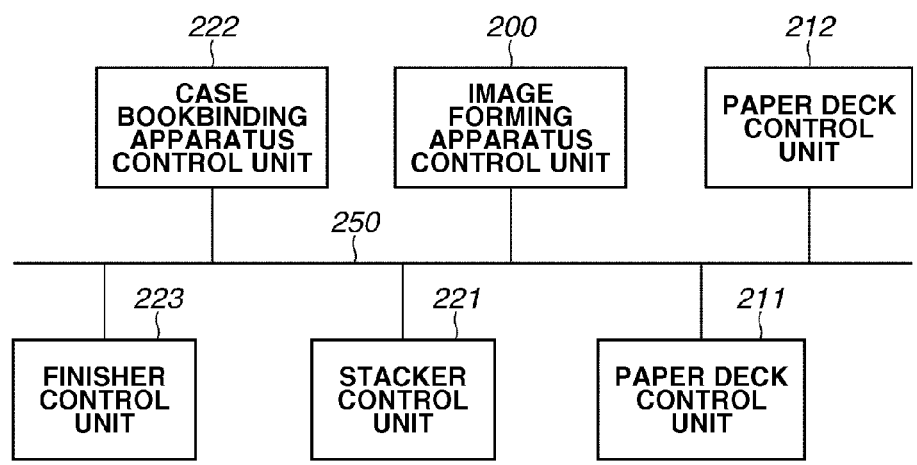
FIG. 2 is a block diagram illustrating control units of respective accessory devices including an image forming apparatus.

FIG. 2 is a block diagram illustrating control units of respective accessory devices including the image forming apparatus 100.

As illustrated in FIG. 2, the image forming apparatus 100, the paper decks 111 and 112, the stacker 121, the case bookbinding device 122, and the finisher 123 are controlled by control units 200, 211, 212, 221, 222 and 223, respectively. The control units 200, 211, 212, 221, 222 and 223 are connected via an intra-device network 250, such as a controller area network (CAN). Then, various information such as information about a conveyance status of sheets, and sheet feeding information (e.g., a sheet feed stage designated by a user), sheet discharge information (e.g., a bookbinding mode designated by a user) are sent and received between each of the control units.

The control units 211, 212, 221, 222, and 223 of the accessory devices each have a CPU for controlling the respective accessory devices. A read only memory (ROM) for storing control programs and a random access memory (RAM) for storing work data of the control programs are connected to the CPU.

Figure 3:
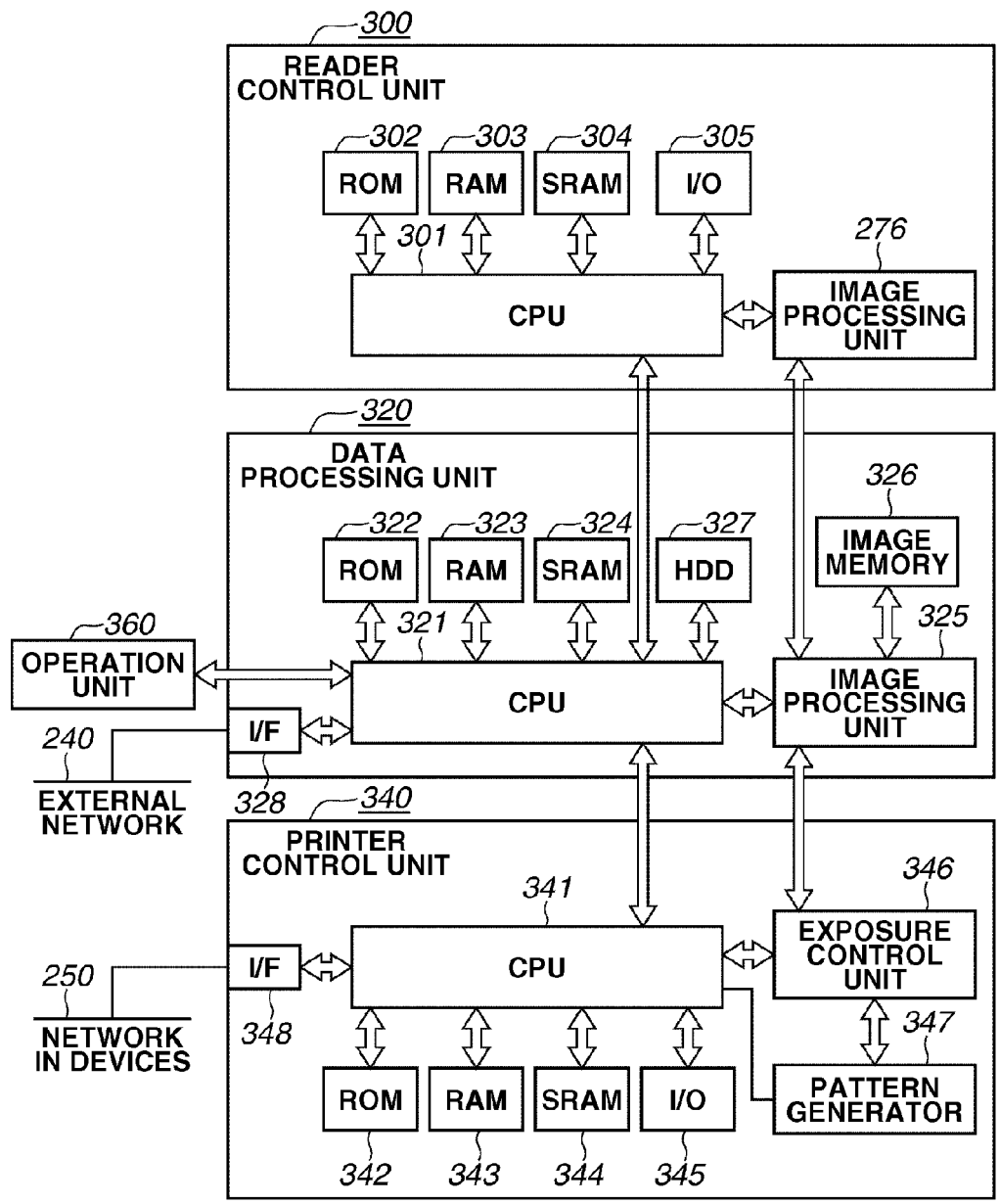
FIG. 3 is a block diagram illustrating an image forming apparatus control unit in detail.

FIG. 3 is a block diagram illustrating an image forming apparatus control unit in detail.

An image forming apparatus control unit 200 serving as a control unit of the image forming apparatus 100 includes a reader control unit 300, a data processing unit 320, and a printer control unit 340. A CPU 301 of the reader control unit 300 and a CPU 321 of the data processing unit 320 are serially connected. Further, the CPU 321 of the data processing unit 320 and a CPU 341 of the printer control unit 340 are also serially connected.

By serially connecting the CPU 301, the CPU 321, and the CPU 341, data such as a document size and a print sheet size, and color information, and instructions such as an image reading request, and an image forming request can be sent and received between each CPUs. In the present exemplary embodiment, the data processing unit 320 is configured to determine a transmission order of control programs to be updated, to each accessory device.

When the control programs of each accessory device are updated, the control programs of each accessory device are transferred from external apparatuses such as a computer via an external network 240. Then, the CPU 321 in the data processing unit 320 receives the control programs via a network interface (I/F) 328. The CPU 321 causes a hard disk drive (HDD) 327 to store received data. The HDD 327 can store control programs for a plurality of accessory devices.

In the present exemplary embodiment, a network I/F for sending and receiving data to/from external apparatuses is configured by Ethernet, although other communication methods such as recommended standard (RS)-232C and universal serial bus (USB) may be used.

The control programs of each accessory device stored in the HDD 327 are sent from the data processing unit 320 to the printer control unit 340, and is further sent to each accessory devices therefrom via a network interface (I/F) 348. The network I/F 348 is connected to the intra-device network 250 in FIG. 2, and the control programs are sent to the respective accessory devices via the intra-device network 250.

FIG. 4 illustrates an example of additional information added to a control program in the first exemplary embodiment.

As illustrated in FIG. 4, time required for updating a control program in each accessory device is recorded in additional information corresponding to the control program. Additional information 400 includes a unit identification (ID) 401 assigned to each accessory device, and a file name 402, a check sum 403, and update time 404 of the control program.

The additional information 400 is added to control programs that are distributed as a file to a user or service engineer. Then, the user or service engineer sends the control programs and additional information of each accessory device to the data processing unit 320 via the network I/F 328 using external apparatuses (a computer, an external memory and so forth).

For example, the user or service engineer receives control programs and additional information of each accessory device from a computer connected with the image forming apparatus 100, and can incorporate them into the image forming apparatus 100. The user or service engineer may connect to the image forming apparatus 100 an external memory that has stored the control programs and the additional information of each accessory device, and incorporate the control programs and the additional information thereinto.

The control programs and the additional information 400 received from external apparatuses such as the computer and the external memory are stored in the HDD 327 inside the data processing unit 320. The CPU 321 inside the data processing unit 320 determines the transmission order of the control programs based on time (update time) required for updating the control program stored in the HDD 327.

More specifically, the CPU 321 determines a control program that requires longest time for update thereof by referring to the update time 404 of the additional information 400 corresponding to the control programs of each accessory device. Then, the CPU 321 sends control programs to corresponding accessory devices in the order of update time that the control program requires, from the longest to the shortest.

Figure 5:
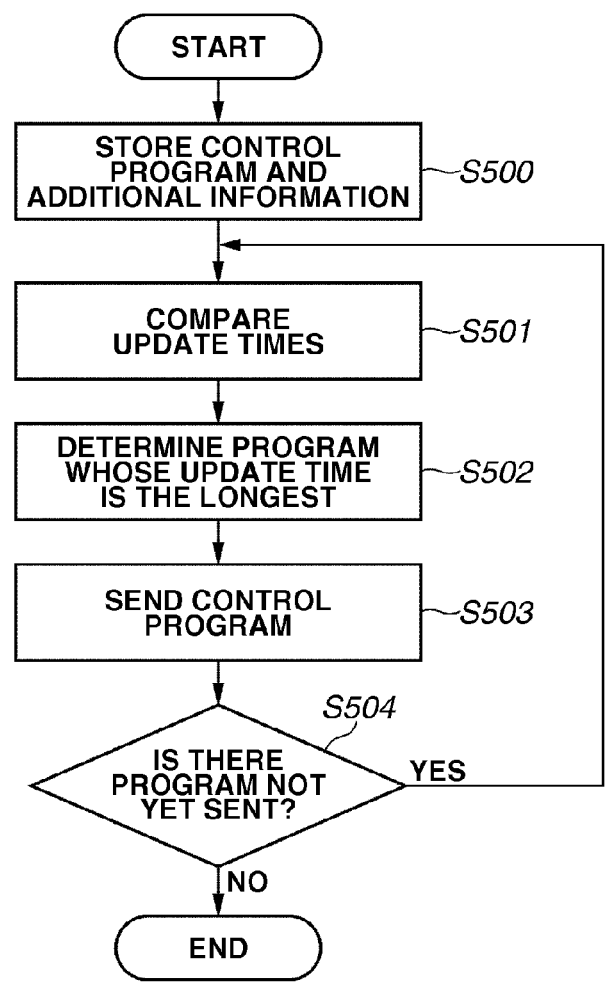
FIG. 5 is a flowchart illustrating transmission control of a control program in the first exemplary embodiment.

FIG. 5 is a flowchart illustrating transmission control of control programs in the first exemplary embodiment.

A control program for executing processes of the flowchart is stored in the ROM 322 in the data processing unit 320 and is executed by the CPU 321.

First, in step S500, the CPU 321 receives the control program and the additional information 400 of each accessory device from external apparatuses and stores them in the HDD 327.

In step S501, the CPU 321 reads out and compares update time 404 corresponding to a control program not yet sent of each accessory device stored in the HDD 327. In step S502, the CPU 321 determines a program whose update time 404 is the longest among the control programs not yet sent based on a comparison result.

In step S503, the CPU 321 sends the control program which is determined that the update time 404 thereof is the longest among the control programs not yet sent, to the accessory device corresponding to the control program. In other words, the CPU 321 sends the control program determined in step S502 to a corresponding accessory device in priority to other control programs.

Then, in step S504, the CPU 321 determines whether there are any other control programs not yet sent. If there is a control program not yet sent (YES in step S504), then the process returns to step S501 and the CPU 321 repeats the above-described processes until no data to be sent is left. According to the control program which is in the second place or later in the transmission order, the CPU 321 sends the one which requires longer time for update (update time) in priority to the other.

On the other hand, in step S504, if there is no control program not yet sent (NO in step S504), the CPU 321 terminates the transmission control according to the flowchart.

The additional information needs not take a format such as the one illustrated in FIG. 4, and any format may be used as long as it can determine update time of the control program.

FIG. 6 illustrates another example of the additional information added to the control program in the first exemplary embodiment.

Additional information 600 illustrated in FIG. 6 includes a unit ID 601, a file name 602, a size 603, a check sum 604, and an update speed (size of data that can be updated per unit time) 605 that are assigned uniquely to each accessory device.

In the present exemplary embodiment, the data processing unit 320 can determine the update time of the control program by dividing the size 603 by the update speed 605 of control program based on the additional information 600.

According to the present exemplary embodiment, by sending control programs in the order of update time thereof from the longest to the shortest, the update time of the control programs as the whole system can be shortened compared with a case where the transmission order is determined without considering update time of the control programs.

FIG. 7 illustrates an example of additional information added to a control program in a second exemplary embodiment.

In the present exemplary embodiment, a unit ID 701 and an update speed 702 of the control program that are uniquely assigned to each accessory device are stored in the control program of each accessory device as additional information 700.

Figure 8:
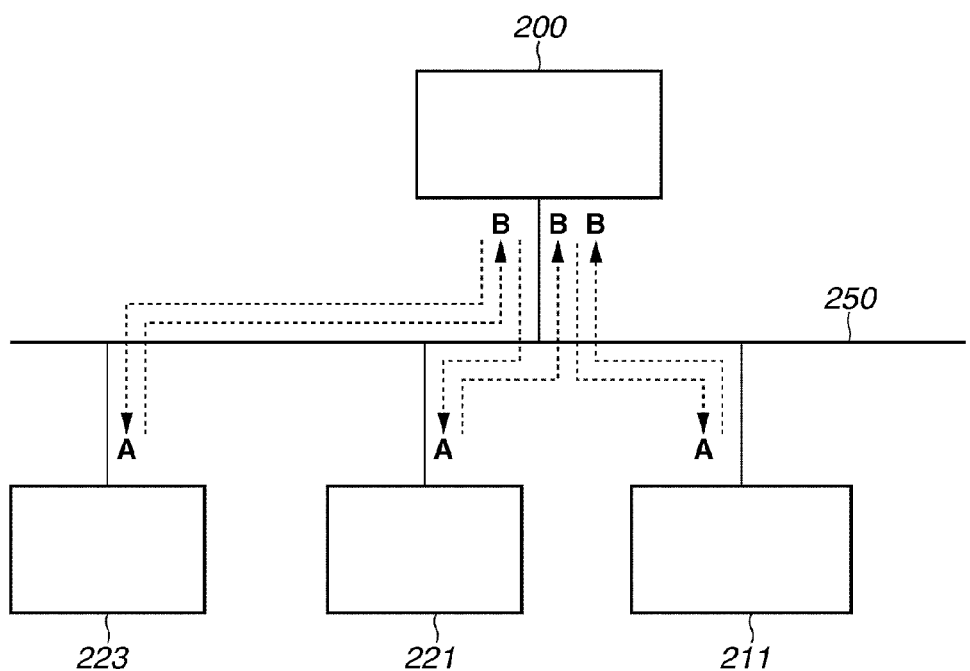
FIG. 8 illustrates exchange of information among control units in the second exemplary embodiment.

FIG. 8 illustrates exchange of information among the control units in the second exemplary embodiment.

As illustrated in FIG. 8, the image forming apparatus control unit 200 sends a signal requesting for the additional information to control units 223, 221 and 211 of the respective accessory devices via the intra-device network 250 (dotted lines A in FIG. 8).

Next, the control units 223, 221 and 211 of the respective accessory devices that received the request send the additional information stored in the respective control programs to the image forming apparatus control unit 200 (dotted lines B in FIG. 8). The data processing unit 320 in the image forming apparatus control unit 200 collects the additional information sent from the control units 223, 221 and 211 of respective accessory devices.

Then, the data processing unit 320 in the image forming apparatus control unit 200 calculates update time from the update speeds 702 included in the additional information collected from the control units 223, 221 and 211 of the respective accessory devices, and sizes of respective control programs received from external apparatuses.

According to the present exemplary embodiment, by storing the update speed 702 of the control program in the control programs of respective accessory devices as additional information, a task to distribute the additional information together with the control programs as a file to a user or service engineer can be saved.

FIGS. 9A to 9C illustrate examples of additional information added to control programs in a third exemplary embodiment.

When control programs is compressed, and the compressed programs are decompressed by each accessory device, it is necessary to consider not only update time of the control programs, but also decompression time of the compressed data.

In the present exemplary embodiment, as illustrated in FIGS. 9A to 9C, decompression time is separately added as additional information for decompressing data. In FIG. 9A, decompression time 905 is added to the above described FIG. 4. In FIG. 9B, decompression speed 916 is added to the above described FIG. 6. In FIG. 9C, decompression speed 923 is added to the above described FIG. 7.

In the present exemplary embodiment, when update time is compared in step S501 of FIG. 5, decompression time added to the additional information is also compared. More specifically, the CPU 321 in the data processing unit 320 calculates total time of the update time and the decompression time from the additional information corresponding to the control programs not yet sent, and compare the total time.

Figure 10:
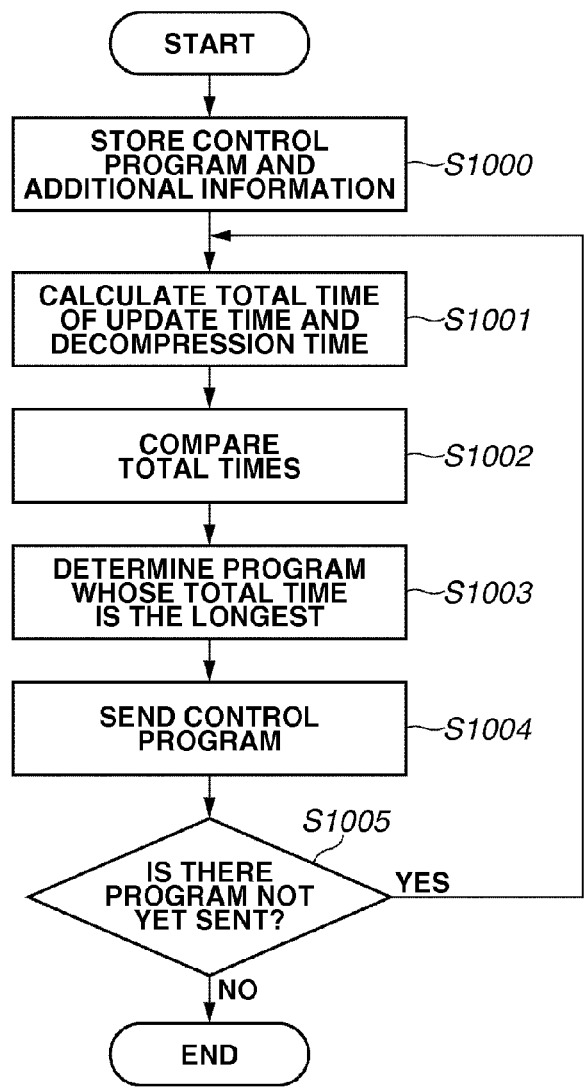
FIG. 10 is a flowchart illustrating transmission control of a control program in the third exemplary embodiment.

FIG. 10 is a flowchart illustrating transmission control of control programs in the third exemplary embodiment.

A control program for executing processes of the flowchart is stored in the ROM 322 in the data processing unit 320, and executed by the CPU 321.

First, in step S1000, the CPU 321 receives the control programs of each accessory device in a compressed status and the additional information corresponding to the control program from external apparatuses, and stores them in the HDD 327.

In step S1001, the CPU 321 calculates total time of update time and decompression time corresponding to a control program not yet sent of each accessory device. In step S1002, the CPU 321 compares the calculated total time. In step S1003, the CPU 321 determines a program whose total time is the longest among the control programs not yet sent based on a comparison result.

In step S1004, the CPU 321 sends the control program which is determined that the total time thereof is the longest among the control programs not yet sent to the accessory device corresponding to the control program. In other words, the CPU 321 sends the control program determined in step S1003 to corresponding accessory device in priority to other control programs.

Then in step S1005, the CPU 321 determines whether there are any other control programs not yet sent. If there is a control program not yet sent (YES in step S1005), the process returns to step S1001 and the CPU 321 repeats the above-described processes until no data to be sent is left. According to the control program which is in the second place or later in the transmission order, the CPU 321 sends the one whose total time is longer in priority to the other.

On the other hand, in step S1005, if there is no control program not yet sent (NO in step S1005), the CPU 321 terminates the transmission control according to the flowchart.

According to the present exemplary embodiment, if the control program is compressed, the update time of the control program as the whole system can be shortened by taking time required for decompressing the compressed control programs into account.

While the present invention has been described with reference to the exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-159667 filed Jun. 18, 2008, which is hereby incorporated by reference herein in its entirety.

What is claimed is:

1. An image forming apparatus connected to a plurality of accessory devices, the image forming apparatus comprising:
a storage unit configured to store a plurality of control programs to be updated corresponding to each of the plurality of accessory devices; and
a control unit configured to send a control program whose update time is the longest among the plurality of control programs to be updated which are stored in the storage unit, to the accessory device in priority to other control programs,
wherein the storage unit stores the control programs to be updated together with information about update speeds of the control programs and information about sizes of the control programs, and
the control unit calculates update time of the control programs based on the information about the update speeds and the information about the sizes of the control programs stored in the storage unit, and determines a transmission order of the control programs based on the update time.

2. The image forming apparatus according to claim 1, wherein the control unit determines a transmission order so as to send control programs in an order of update time thereof from the longest to the shortest.

3. The image forming apparatus according to claim 1, wherein the storage unit stores the control programs to be updated together with information about update time of the control programs, and
the control unit determines a transmission order of the control programs based on the information about the update time stored in the storage unit.

4. An image forming apparatus connected to a plurality of accessory devices, the image forming apparatus comprising:
a storage unit configured to store a plurality of control programs to be updated corresponding to each of the plurality of accessory devices together with information about sizes of the control programs;
a collection unit configured to collect information about update speeds corresponding to each of the plurality of accessory devices therefrom; and
a control unit configured to calculate update time of control programs based on the information about the sizes of the control program stored in the storage unit and the information about the update speeds collected by the collection unit, and to send a control program of which the calculated update time is the longest, to the accessory device in priority to other control programs.

5. An image forming apparatus connected to a plurality of accessory devices, the image forming apparatus comprising:
a storage unit configured to store a plurality of control programs to be updated corresponding to each of the plurality of accessory devices in a compressed status, and to store information about update time of the control programs and information about decompression time required in decompressing the control programs that are previously compressed; and
a control unit configured to calculate total time of the update time and the decompression time stored in the storage unit, and to send a control program of which the calculated total time is the longest, to the accessory device in priority to other control programs.

* * * * *